United States Patent
Scipioni

(10) Patent No.: US 10,181,123 B2
(45) Date of Patent: Jan. 15, 2019

(54) SYSTEMS AND METHODS FOR GENERATING SUGGESTIONS AND ENFORCING TRANSACTION RESTRICTIONS

(71) Applicant: PAYPAL, INC., San Jose, CA (US)

(72) Inventor: German Scipioni, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 646 days.

(21) Appl. No.: 14/541,593

(22) Filed: Nov. 14, 2014

(65) Prior Publication Data

US 2016/0140555 A1 May 19, 2016

(51) Int. Cl.
  *G06Q 20/40* (2012.01)
  *G06Q 20/38* (2012.01)
  *G06Q 20/12* (2012.01)
  *G06Q 20/20* (2012.01)

(52) U.S. Cl.
  CPC .......... *G06Q 20/405* (2013.01); *G06Q 20/12* (2013.01); *G06Q 20/20* (2013.01); *G06Q 20/381* (2013.01)

(58) Field of Classification Search
  CPC .................................................. G06Q 20/40
  USPC .................................................... 705/37, 39
  See application file for complete search history.

(56) References Cited

U.S. PATENT DOCUMENTS

| 2015/0026031 A1* | 1/2015 | Mullin, III | G06Q 40/04 705/37 |
| 2015/0302367 A1* | 10/2015 | Billou | G06Q 20/10 705/39 |
| 2016/0104239 A1* | 4/2016 | Johnson | G06Q 40/04 705/37 |

OTHER PUBLICATIONS

"The New Landscape of Travel: A Comprehensive Analysis of Smartphone Apps," by Zheng Xiang. Virginia Polytechnic Institute and State University. Jan. 2012.*

* cited by examiner

*Primary Examiner* — Sara C Hamilton
(74) *Attorney, Agent, or Firm* — Haynes and Boone, LLP

(57) ABSTRACT

A user traveling abroad may decide to make a purchase transaction from a merchant, or exchange cash to foreign currency, or withdraw foreign currency from a funding source of the user. A service provider server may determine exchange rates and transaction fees for different funding sources of the user and/or at different currency exchange locations. The service provider server may further suggest a particular funding source and/or a currency exchange location. The user may conveniently make an informed decision regarding which currency exchange location to go to and which funding source to use. After the trip, the user may have leftover foreign currency. The user may exchange the foreign currency for credit in a restricted account that can be used to make purchases but cannot be cashed out. The credit may be converted to domestic currency and may conveniently be used to make purchases.

20 Claims, 6 Drawing Sheets

SYSTEMS AND METHODS FOR GENERATING SUGGESTIONS AND ENFORCING TRANSACTION RESTRICTIONS

BACKGROUND

Field of the Invention

The present invention generally relates to techniques for real-time generation of suggestions and transaction management and, in particular, to systems and methods for generating suggestions based on locations and funding sources and for enforcing transaction restrictions.

Related Art

In today's commerce, customers traveling abroad may engage in transactions, such as purchases, withdrawals, or conversion, involving foreign currency exchange. A customer may have various funding sources (e.g., cash, credit cards, debit cards, bank accounts, or other funding sources). Depending on which funding source is used at a merchant, or which currency exchange location is used for withdrawals or conversions, the user may receive a different currency exchange rate and/or be charged different transaction fees. It may be difficult for customers to determine which funding source to use and/or where to exchange or withdraw money to get the best exchange rate and minimize transaction fees, which is inconvenient for customers.

Figure 1:
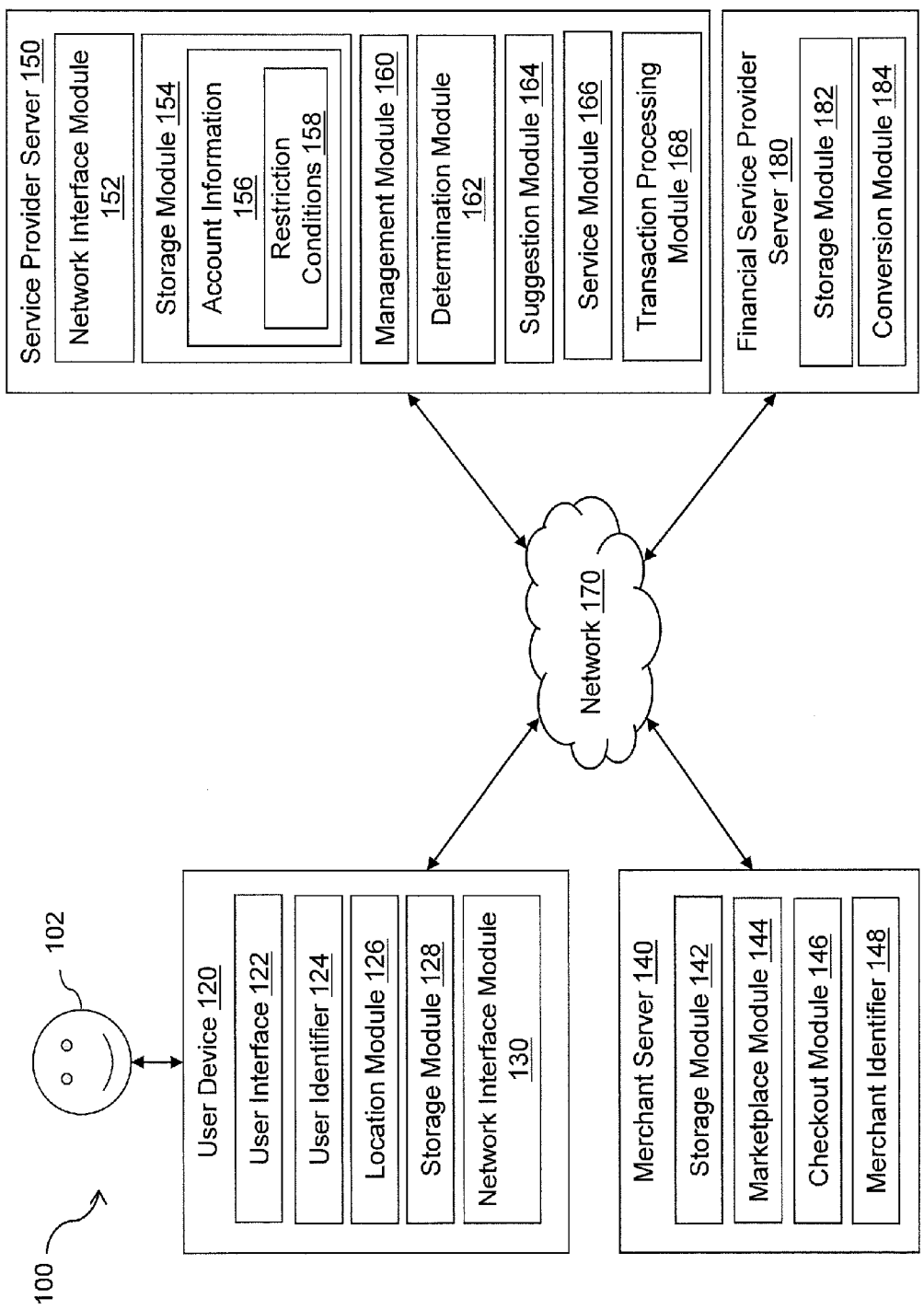
FIG. 1 is a block diagram of a networked system suitable for implementing funding source suggestion, transaction location suggestion, and exchange of foreign currency for credit according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for funding source suggestion, transaction location suggestion, and exchange of foreign currency for credit. Users traveling abroad may have various funding sources (e.g., cash, credit cards, debit cards, bank accounts, or other funding sources), which may be maintained by a financial institution (e.g., a bank, a credit issuer, or other financial institution), to choose from when making a payment at a merchant. Further, there may be numerous currency exchange locations (e.g., automated teller machines (ATMs), currency exchange booths, or bank locations), each operated by a financial institution, to choose from when withdrawing foreign currency.

In various embodiments, a user traveling abroad (or shopping online on a foreign website) may decide to use one of the user's funding sources to purchase items, such as goods and/or services, from a merchant that accepts a foreign currency. The user may enter information regarding the desired purchase on a user device, which transmits the desired purchase information to a service provider server. The service provider server may identify funding sources of the user and determine that one or more of the funding sources are of a different currency than the currency accepted by the merchant. The service provider server may determine, if applicable, exchange rates and transaction fees for each of the funding sources based on the type of funding source (e.g., cash of a particular currency, a particular credit card, a particular debit card, a particular bank account, etc.), the current exchange rate for each funding source, and the transaction fees associated with each funding source.

The service provider server may generate suggestion information that includes suggested funding sources by comparing the exchange rates and fees, variable or fixed fees, information gathered from other users (e.g., based on crowdsourcing), total amount to be paid for the desired purchase, and other information for each of the funding sources. The service provider may generate such suggestion information in real-time and transmit the suggestion information to the user device, which may include the exchange rates and fees, variable or fixed fees, information gathered from other users (e.g., based on crowdsourcing), total amount to be paid, and other information for each of the funding sources, and may also compare using cash and using credit/debit card. The user may view the suggestion information on the user device and advantageously make an informed decision regarding which funding source to use.

In certain embodiments, the user may provide a merchant location where the user plans to make the desired purchase. The service provider server may receive merchant location information and determine exchange rates and fees specific for the merchant location, which may include a dynamic currency conversion (DCC) rate. A dynamic currency conversion is a service available at certain merchants in which the payment amount is converted to the user's preferred currency using the DCC rate at the point of sale. The DCC rate may be higher or lower than the conversion rate applied by credit card issuers or banks. The suggestion information transmitted to the user device may further compare using cash, using credit/debit card with an exchange rate of the credit card issuer/bank, using credit/debit card with the DCC rate, and other payment options.

In further embodiments, the service provider server may determine candidate merchant locations based on the merchant location or a current location of the user. The service provider may transmit suggestion information that compares making the purchase at the merchant location and the candidate merchant locations.

In various embodiments, a user traveling abroad may decide to withdraw foreign currency from one of the user's funding source or convert cash to foreign currency. The user may enter information regarding the desired withdrawal or conversion on a user device, which transmits the desired withdrawal/conversion information to a service provider server. The user device may determine (e.g., using a location module) a location or may receive a location via user input, and transmit the location to the service provider server. The service provider server may determine candidate currency exchange locations based on the location. For example, the service provider server may determine that one or more currency exchange locations are within traveling distance of the user. The traveling distance may be shorter (e.g., 0.5 miles, 10 minute walk, etc.) if the user is walking compared to if the user is driving (e.g., 5 miles, 10 minute drive, etc.). The service provider server may determine the exchange rates and transaction fees at each of the candidate currency exchange locations.

The service provider server may generate suggestion information that includes suggested currency exchange locations based on comparing the exchange rates and fees, variable or fixed fees, information gathered from other users (e.g., based on crowdsourcing), total amount to be paid for the desired withdrawal or conversion, safety (e.g., based on crime in the area and time of day), and other information for each of the candidate currency exchange locations. The service provider may generate such suggestion information in real-time and transmit the suggestion information to the user device, which may include the exchange rates and fees, variable or fixed fees, information gathered from other users (e.g., based on crowdsourcing), total amount to be paid for the desired withdrawal or conversion, safety (e.g., based on crime in the area and time of day), and other information for each of the candidate currency exchange locations. The user may view the suggestion information on the user device and advantageously make an informed decision regarding which candidate currency exchange location to go to.

In certain embodiments, the service provider server may identify funding sources of the user and determine, if applicable, exchange rates and transaction fees for each of the funding sources at each of the candidate currency exchange locations, the type of funding source (e.g., cash of a particular currency, a particular credit card, a particular debit card, a particular bank account, etc.), the current exchange rate for each funding source, and the foreign transaction fees associated with each funding source. The service provider may generate and transmit suggestion information that includes suggested currency exchange location-funding source combinations by comparing the exchange rates and transaction fees for each combination of candidate currency exchange locations and the funding sources of the user. The user may view the exchange location information on the user device and advantageously make an informed decision regarding both which currency exchange location to go to and which funding source to use.

In further embodiments, a service provider server may maintain and update exchange rate and fee information and transaction location information based on receiving such information from financial institutions that operate currency exchange locations and/or maintain funding sources (e.g., from reporting of daily rates by the financial institutions). The service provider server may maintain and update the exchange rate and fee information and the transaction location information based on receiving such information from users by transmitting a request for information (e.g., asking users a series of questions) and receiving the requested information. For example, after a purchase at a merchant or a conversion/withdrawal at a currency exchange location, user may be prompted on user device to answer questions that ask for information (e.g., "how much did you pay?"; "how safe would you rate the location?"; etc.) and/or verify information received from other users or other channels (e.g., "were you charged a transaction fee of $1.50?"; "was the exchange rate £0.62 for $1?"; "was the location too far?"; etc.). Further, the service provider server may score financial institutions for their exchange rates and transaction fees, and score each user for his or her accuracy and/or trustworthiness. The score of a user may be used to filter out potential inaccurate information and/or determine how much weight to give to the user's responses.

In various embodiments, a user may decide to get rid of cash in a foreign currency, for example, at the end of a trip abroad. The user may deposit the foreign currency, for example, at a merchant or a currency exchange location that accepts payment through a service provider. The merchant or the currency exchange location may charge a transaction fee for the deposit. A service provider server receives foreign currency deposit information for a deposit amount from the merchant, and applies a credit (which may be also called a voucher or a gift card) to a user account maintained by the service provider server. The user account has restriction conditions, which provide that requests for purchases are allowed but requests for cash withdrawals are denied. Accordingly, the user account may be used for purchases but cannot be used for cash withdrawals. The credit in foreign currency may be converted into a different currency unit, such as a domestic currency unit (e.g., dollar) based on the current exchange rate of the service provider. The conversion may be at the time of deposit or when authorized by the user. Advantageously, users may conveniently deposit foreign currency left over from a trip at any merchant that accepts payment through the service provider, and use the received credit for future purchases. Moreover, the restriction conditions of the user account prevent cash withdrawals, which advantageously prevents money laundering, especially cross-border money laundering, and provides a convenient method of using foreign currency left over from a trip for travelers.

In certain embodiments, the service provider server may associate a barcode (e.g., a Quick Response (QR) code), a user identifier, or credentials (e.g., password, user ID, username phone number, email address, etc.) with the user account. The user may use the restricted account at merchants that accept payment through the service provider by scanning the QR code, checking-in to a merchant location by the user device transmitting the user identifier to a merchant device, and/or by entering credentials on a merchant device.

Referring now to FIG. 1, a block diagram of a networked system 100 configured to implement a process for currency exchange location and funding source comparison/suggestion, and exchange of foreign currency for credit is illustrated according to an embodiment of the present disclosure. Networked system 100 may comprise or implement a plurality of servers and/or software components that operate to perform various transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include one or more user devices 120, one or more merchant servers or devices 140, one or more service provider servers or devices 150, and one or more financial service provider servers or devices 180 in communication over a network 170. A user 102, such as a consumer, may utilize user device 120 to perform an electronic transaction using service provider server 150. For example, user 102 may utilize user device 120 to visit a merchant's website provided by merchant server 140 or the merchant's brick-and-mortar store to browse for items, such as goods and/or services, offered by the merchant. Further, user 102 may utilize user device 120 to initiate a transaction, receive a transaction approval request, or reply to the request. Note that transaction, as used herein, refers to any suitable action performed using the user device, including payments, withdrawals, conversions, transfer of information, display of information, etc. Although only one merchant server 140 is shown, a plurality of merchant servers may be utilized if the user is purchasing products from multiple merchants.

User device 120, merchant server 140, and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Network 170 may be implemented as a single network or a combination of multiple networks. For example, in various embodiments, network 170 may include the Internet or one or more intranets, landline networks, wireless networks, and/or other appropriate types of networks.

One or more user devices 120 may be implemented using any appropriate hardware and software configured for wired and/or wireless communication over network 170. In various embodiments, user devices 120 may include at least one of a smartphone, wireless cellular phone, satellite phone, tablet, laptop computer, notebook computer, hybrid/convertible computer, and/or other types of mobile computing devices. In other embodiments, user devices 120 may include at least one of a wearable device, such as an activity tracker (which may also be called a fitness tracker and/or health tracker), smartwatch, eyeglasses with appropriate computer hardware resources, and/or other types of wearable computing devices. User devices 120 may include a user interface module 122, one or more user identifiers 134, a location module 126, a storage module 128, a network interface module 130, and other modules.

In various implementations, user 102 is able to input data and information into an input component (e.g., a touchscreen, a keyboard, a microphone, etc.) of user device 120 to provide personal information, user interest information, user identification information, and other user data and/or information.

User interface module 122, in an embodiment, may be utilized by user 102 to access applications or modules, to view data or information on a display, and to conduct transactions (e.g., shopping, purchasing, bidding, etc.) with merchant server 140 and/or service provider server 150 over network 170. In one aspect, user 102 may login to an account related to user 102 and purchase expenses may be directly and/or automatically debited from the account via the user interface module 122.

In one implementation, user interface module 122 comprises a software program, such as a graphical user interface (GUI), executable by a processor that is configured to interface and communicate with service provider server 150 via network 170. In another implementation, user interface module 122 comprises a browser module, which may be used to provide a convenient interface to permit user 102 to browse information available over network 170. For example, browser module may be implemented as a web browser configured to view information available over the Internet, such as a user account for online shopping and/or merchant sites for viewing and purchasing goods and services. In an example, user 102 is able to access merchant websites via the one or more merchant servers 140 to view and select items for purchase, and the user 102 is able to purchase items from the one or more merchant servers 140 via the service provider server 150. Accordingly, in one or more embodiments, user 102 may conduct transactions (e.g., purchase and provide payment for one or more items) from one or more merchant servers 140 via the service provider server 180. In a further implementation, user interface module 122 comprises a toolbar module, which may be used to provide client-side processing for performing desired tasks in response to operations selected by user 102. For example, toolbar module may display a user interface in connection with browser module.

User device 120, in various embodiments, may include other modules as may be desired in one or more embodiments of the present disclosure to provide additional features available to user 102. In one example, such other modules may include security modules for implementing client-side security features, programmatic client modules for interfacing with appropriate application programming interfaces (APIs) over network 170, and/or various other types of generally known programs and/or software modules. In another example, the other modules may perform functions that allow user 102 to send and receive emails, calls, and texts through network 170 (e.g., email, texting, voice and instant messaging modules), and/or enable user 102 to communicate, transfer information, and/or make payments. In still other examples, the other modules may interface with user interface module 122 for improved efficiency and convenience.

User identifier 124, in an embodiment, may be implemented, for example, as operating system registry entries, cookies associated with user interface module 122, identifiers associated with hardware of user device 120, or various other appropriate identifiers. User identifier 124 may include one or more attributes related to user 102, such as personal information related to user 102 (e.g., one or more of names, usernames, passwords, photograph images, biometric IDs, addresses, phone numbers, social security number, etc.), banking information, financial information, funding source information (e.g., one or more banking institutions, credit card issuers, user account numbers, security data and information, etc.) and other user information. In various embodiments, user device 120 may transmit (e.g., via network interface module 130) user identifier 124 to service provider server 150 (e.g., via network interface module 152). In certain embodiments, user device 120 may transmit user identifier 124 that includes credentials (e.g., one or more of a password, user ID, username phone number, email address, etc.) to service provider server 150, and service provider server 150 may use the credentials to associate user 102 with a particular user account maintained by service provider server 150. Service provider server 150 may also use the credentials to login user 102 to the user account and provide access to account information for the user account on user device 120.

Location module 126, in various embodiments, determines, tracks, monitors, and/or provides an instant geographical location of user device 120. In one implementation, the geographical location may include GPS coordinates, zip-code information, area-code information, street address information, and/or various other generally known types of location data or information. In various embodiments, location data may be automatically obtained and/or provided by user device 120 via an internal or external monitoring component, such as global positioning system (GPS), which uses satellite-based positioning, assisted GPS (A-GPS), which uses cell tower information to improve reliability and accuracy of GPS-based positioning, and Wi-Fi-based positioning. In other embodiments, location data may be obtained based on communications between user device 120 and a device at a location, such as a check-in device (e.g., a beacon device). This may help to save battery life and allow for better indoor location. In further embodiments, location information may be directly entered into user device 120 by user 102 via a user input component, such as a keyboard, touch display, and/or voice recognition microphone.

In one aspect, when interfacing with user device 120, user 102 may elect and/or consent to provide personal information, user interest data, sensor data, location data, and/or other user data or information to merchant server 140 and/or service provider server 150. User 102 may set or configure the user settings/configuration menu of user interface module 122 of user device 120. Through the user settings/configuration menu, user 102 may provide consent to share user data or information and the extent of shared user data or information. User device 120 may transmit shared user data or information dynamically by push synchronization, periodically, or each time an application associated with merchant server 140 or service provider server 150 is opened by user 102. In some embodiments, user 102 may be prompted for permission to release user data or information. Accordingly, user 102 may have exclusive authority to allow transmission of personal information, user interest data, sensor data, and/or location data from the user device 120 to merchant server 140 and/or service provider server 150.

Storage module 128, in an embodiment, may store data and information. Storage module 128 may contain one or more databases in which to store the data and information. User device 120 may locally store user account information and/or other user data or information in a database on storage module 128.

Network interface module 130, in various embodiments, communicates with other devices or servers over network 170. For example, user device 120 may communicate with merchant server 140 and/or service provider server 150 via network interface module 130 exchanging data with a network interface module of respective servers over network 170.

Merchant server 140, in various embodiments, may be maintained by a merchant offering various items for purchase, such as goods and/or services. The merchant may have a physical point-of-sale (POS) store front. The merchant may be a participating merchant who has a merchant account with a service provider. Merchant server 140 may be used for POS or online purchases and transactions. Generally, merchant server 140 may be maintained by anyone or any entity that receives money, which includes charities as well as retailers and restaurants. For example, a transaction may be a donation to charity. Merchant server 140 may include one or more databases on a storage module 142 that identifies available items, which may be made available for viewing and purchase by user 102. Accordingly, merchant server 140 also may include a marketplace module 144 which may be configured to provide item information over network 170 to user interface module 122 of user device 120. In one embodiment, user 102 may interact with marketplace module 144 through a browser module of user device 120 over network 170 in order to view various items identified in the one or more databases on storage module 142.

Merchant server 140, in various embodiments, may include a checkout module 146 which may be configured to facilitate the purchase by user 102 of goods and/or services online or at a physical POS or store front. Checkout module 146 may be configured to accept payment information from or on behalf of user 102 through service provider server 150 over network 170. For example, checkout module 146 may receive and process a payment confirmation from service provider server 150, as well as transmit transaction information to the service provider and receive information from the service provider (e.g., a transaction ID). Checkout module 146 may be configured to receive payment via a plurality of payment methods including cash, credit cards, debit cards, checks, money orders, or the like.

Merchant server 140, in an embodiment, may include at least one merchant identifier 148, which may be included as part of the one or more items made available for purchase so that, for example, particular items are associated with particular merchants. In one implementation, merchant identifier 148 may include one or more attributes and/or parameters related to the merchant, such as business and banking information. Merchant identifier 148 may include attributes related to merchant server 140, such as identification information (e.g., a serial number, a location address, GPS coordinates, a network identification number, etc.). In various embodiments, user 102 may conduct transactions (e.g., searching, selection, monitoring, purchasing, and/or providing payment for items) with each merchant server 140 via service provider server 150 over network 170.

Service provider server 150, in various embodiments, may be maintained by a service provider, such as an online service provider or a transaction processing entity that provides processing for financial transactions and/or information transactions between user 102 and one or more of merchant servers 140 and/or financial service provider servers 180. In one example, service provider server 150 may be provided by PayPal® Inc. or eBay® Inc. in San Jose, Calif., USA, and/or one or more financial institutions or a respective intermediary that may provide multiple point of sale devices at various locations to facilitate transaction routings between merchants and, for example, financial institutions.

Service provider server 150, in various embodiments, includes a network interface module 152 that is communicatively coupled to network 170. Network interface module 152 may be communicatively coupled to any or all of a management module 160, a determination module 162, a suggestion module 164, a service module 166, and a transaction processing module 168, any of which may be coupled to a storage module 154. Any or all of the modules may be implemented as a subsystem of service provider server 150 including a circuit, a hardware component, a hardware subcomponent, and/or a variety of other subsystems known in the art. Furthermore, any or all of the modules 152, 154, 160, 162, 164, 166, 168 may be preconfigured to perform their disclosed functionality, or may be configured by a processing system "on-the-fly" or as needed to perform their disclosed functionality. As such, any or all of the modules may include pre-configured and dedicated circuits and/or hardware components, or may be circuits and/or hardware components that are configured as needed.

For example, any or all of the modules may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules to perform the functions described below. As such, in some embodiments, preconfigured and dedicated circuits may be implemented to perform the functions of the modules. In other embodiments, a processing system may execute instructions on a non-transitory, computer-readable medium to configure one or more circuits as needed to perform the functions of the modules.

Network interface module 152 may be included as a separate module provided in service provider server 150, or may include communications hardware (e.g., antennas) and instructions stored on a computer-readable medium that, when executed by a processing system in service provider server 150, configure network interface module 152 to operate the communications hardware to send and receive information over network 170, as well as provide any of the other functionality that is discussed herein.

Management module 160 may be included as a separate module provided in service provider server 150, or may be provided using instructions stored on a computer-readable medium that, when executed by a processing system in service provider server 150, configure management module 160 to update and maintain exchange rate and fee information and transaction location information, as well as provide any of the other functionality that is discussed herein.

Management module 160, in one embodiment, may update and maintain exchange rate and fee information and transaction location information stored in a database in storage module 154. The exchange rate and fee information may include exchange rates, transaction fees, variable or fixed fees, information received from other users (e.g., based on reviews or information gathered by crowdsourcing), and other information for various funding sources (e.g., for each type of credit card offered by various credit card issuers and for each debit card or bank account maintained by various banks.). The transaction location information may include exchange rates, transaction fees, variable or fixed fees, information received from other users (e.g., e.g., based on reviews or information gathered by crowdsourcing), safety (e.g., based on crime in the area), and other information for various transaction location. The exchange rate and fee information and/or transaction location information may also include exchange rates and transaction fees for each combination of transaction locations and funding sources.

Management module 160, in one embodiment, may update and maintain exchange rate and fee information and transaction location information based on receiving such information from financial service provider servers 180 and/or from user devices 120. Management module 160 may receive information regarding current exchange rates and fees for funding sources maintained by a financial institution from financial service provider server 180 maintained by the financial institution. Management module 160 may transmit a request for information regarding a transaction (e.g., exchange rate applied and fees paid for the transaction) and a transaction location (e.g., safety and convenience of the transaction location) to user device 120, and receive requested information from user device 120. For example, management module 160 may gather information by crowdsourcing, e.g., by asking many users 102 a series of questions and receiving responses from the users 102 via user devices 120.

Management module 160, in an embodiment, may score financial institutions for their exchange rates and transaction fees (e.g., relative to exchange rates and transaction fees of other financial institutions), and score users for accuracy and/or trustworthiness. Management module 160 may use the score of a user to filter out potential inaccurate information and/or determine how much weight to give to the user's responses.

Determination module 162 may be included as a separate module provided in service provider server 150, or may be provided using instructions stored on a computer-readable medium that, when executed by a processing system in service provider server 150, configure determination module 162 to determine one or more candidate transaction locations, and determine exchange rates and fees available to user 102 at each of the one or more candidate transaction locations based on one or more funding sources of user 102, as well as provide any of the other functionality that is discussed herein.

Suggestion module 164 may be included as a separate module provided in service provider server 150, or may be provided using instructions stored on a computer-readable medium that, when executed by a processing system in service provider server 150, configure suggestion module 164 to generate suggestion information that includes at least one of a suggested transaction location, a suggested funding source, and/or a suggested transaction location-funding source combination based on a comparison of exchange rates and fees, and transmit the suggestion information to user device 120, as well as provide any of the other functionality that is discussed herein.

Service module 166 may be included as a separate module provided in service provider server 150, or may be provided using instructions stored on a computer-readable medium that, when executed by a processing system in service provider server 150, configure service module 166 to interact with the user device 120 and/or merchant servers 140 over network 170 to maintain one or more user accounts and merchant accounts in a database on storage module 154, facilitate the searching, selection, purchase, and/or payment of items by user 102 from the one or more merchant servers 140, receive foreign currency deposit information for a deposit amount, apply a credit to a user account according to the deposit amount, and convert the credit into a different currency unit, as well as provide any of the other functionality that is discussed herein.

Service module 166, in one embodiment, may maintain one or more user accounts and merchant accounts in a database on storage module 154, each of which may include account information associated with one or more individual users (e.g., user 102) and/or merchants. For example, the account information may include private financial information of user 102 and/or merchants (e.g., one or more merchants associated with merchant servers 140), such as one or more account numbers, passwords, credit card information, banking information, or other types of financial information, which may be used to facilitate financial transactions between user 102 and one or more merchants associated with merchant servers 140. The account information may also include personal information, such as one or more contact information (e.g., phone number, address, email, etc.) and other account IDs of user 102 that are maintained by third parties (e.g., usernames or account numbers). In various aspects, the methods and systems described herein may be modified to accommodate users 102 and/or merchants that may or may not be associated with at least one existing user account and/or merchant account, respectively.

Transaction processing module 168 may be included as a separate module provided in service provider server 150, or may be provided using instructions stored on a computer-readable medium that, when executed by a processing system in service provider server 150, configure transaction processing module 168 to receive transaction request information for a transaction (e.g., for a payment, withdrawal, conversion, or other transaction) from user device 120, merchant server 140, and/or financial service provider server 180, access account information 156 for a user account stored in a database on storage module 154 to determine whether account information 156 includes restriction conditions 158 associated with the user account, determine the transaction request information conforms to restriction conditions 158, and process or deny the transaction, as well as provide any of the other functionality that is discussed herein. In one implementation, transaction processing module 168 assists with resolving financial transactions through validation, delivery, and settlement. As such, service module 166 in conjunction with the transaction processing module 168 settles indebtedness between user 102 and each of merchant servers 140 or financial service provider servers 180, wherein accounts may be directly and/or automatically debited and/or credited of monetary funds in a manner as accepted by the banking industry.

Other modules discussed herein but not illustrated in FIG. 1 may be provided as separate modules on service provider server 150, or using instructions stored on a computer-readable medium similarly as discussed above. While storage module 154 has been illustrated as located in service provider server 150, one of skill in the art will recognize that it may include multiple storage modules and may be connected to other modules through network 170 without departing from the scope of the present disclosure.

In one implementation, user 102 may have identity attributes stored with service provider server 150 in a database on storage module 154, and user 102 may provide authentication data (e.g., credentials) to authenticate or verify identity with service provider server 150. User attributes may include user identifiers 124, credentials (e.g., password, user ID, username phone number, email address, etc.), personal information, banking information and/or funding source information. In various aspects, authentication data including the user attributes may be passed to service provider server 150 as part of a login, search, selection, purchase, and/or payment request, and the authentication data may be utilized by service provider server 150 to associate user 102 with one or more particular user accounts maintained by service provider server 150. For example, the authentication data may be based on a merchant device scanning a barcode (e.g., a QR code) presented on user device 120, a check-in by user device 120 transmitting authentication data to a merchant device (e.g., a beacon), or user 102 entering in credentials on user device 120 or a merchant device.

Financial service provider server 180, in one embodiment, may be maintained by a financial institution that operates currency exchange locations and/or maintains funding sources (e.g., credit cards, debit cards, bank accounts, etc.). Financial service provider server 180 may maintain transaction location information for currency exchange locations operated by the financial institution and funding source information for funding sources maintained by the financial institution on a storage module 182. For example, financial service provider server 180 may maintain the daily currency exchange rate and transaction fees for each currency exchange location, each funding source, and/or for each combination of currency exchange location and funding source. In certain embodiments, financial service provider server 180 includes a conversion module 184 that processes withdrawals and conversions at the currency exchange locations operated by the financial institution.

Figure 2:
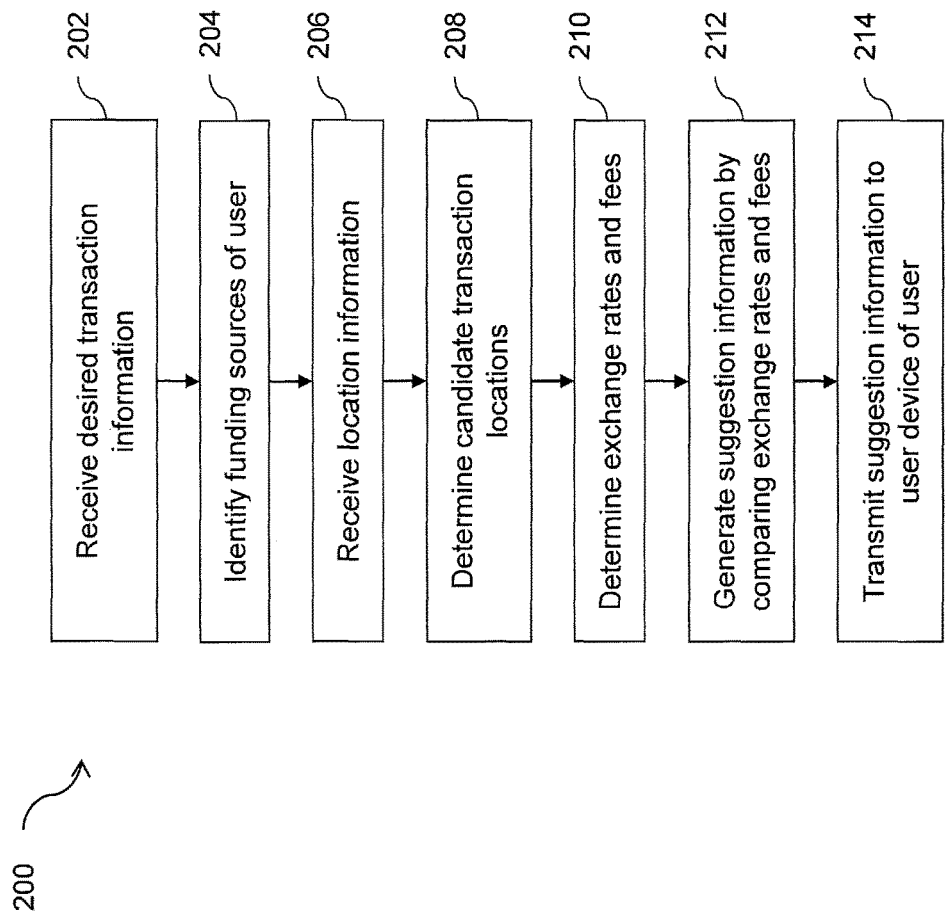
FIG. 2 is a flowchart showing a method for suggesting funding sources, transaction locations, and/or funding source-transaction location combinations according to an embodiment of the present disclosure.

Referring now to FIG. 2, a flowchart 200 showing a method for suggesting funding sources, transaction locations, and/or funding source-transaction location combinations is illustrated according to an embodiment of the present disclosure.

At step 202, service provider server 150 receives desired transaction information from user device 120. In an embodiment, user 102 traveling abroad may be interested in a transaction (e.g., a purchase, withdrawal, conversion, etc.). User 102 may enter information relating to a desired transaction on user device 120, which transmits the desired transaction information to service provider server 150. In an example, the desired transaction information is for a desired purchase, and may include a price of an item for purchase, a merchant location at which user 102 is contemplating the purchase, the identity of the item, and/or other desired purchase information. In another example, the desired transaction information may be for a desired withdrawal or conversion, and may include an amount of money to be withdrawn from a funding source, an amount of cash to be converted to a different currency, a current location of user 102, preferred type of currency exchange location (e.g., ATM, currency exchange booths, or bank locations, etc.), and/or other desired withdrawal/conversion information.

At step 204, service provider server 150 identifies funding sources of user 102. In an embodiment, service provider server 150 accesses account information 156 in storage module 154, which designates one or more funding sources available to user 102, to identify the one or more funding sources available to user 102.

At step 206, service provider server 150 receives location information from user device 120. In an embodiment, user device 120 accesses location module 126 to determine a current location of user device 120, and transmits location information for the current location to service provider server 150. In another embodiment, user 102 enters a current location or a location of interest (e.g., a location where user will be when user plans to initiate the transaction) on user device 120, for example, by entering a zip code or an address via user interface 122. In a further embodiment, user device 120 checks in to a location by communicating with a device at the location (e.g., a beacon), and the location information is for a current location based on the check-in.

At step 208, service provider server 150 determines one or more candidate transaction locations based on the location information received from user device 120. In an embodiment, service provider server 150 (e.g., using determination module 162) determines candidate transaction locations within a certain distance from, or a certain area that includes, the current location or the location of interest. For example, the distance may be a traveling distance depending on the user's situation, such as a short distance if user 102 is walking (e.g., 0.5 miles, 10 minute walk, etc.), and a longer distance if user 102 is driving (e.g., 5 miles or 10 minute drive, etc.). In another example, the area may be an area visible on a map, which includes the current location or the location of interest, presented on user device 120. User 102 may interact with the map by zooming in/out and scrolling, which changes the area.

At step 210, service provider server 150 determines exchange rates and fees available to user 102. In an embodiment, service provider server 150 (e.g., using determination module 162) determines exchange rates and fees available to user 102 at each of the one or more candidate transaction locations based on the funding sources available to user 102.

The exchange rate and fee at each candidate transaction location may depend on what funding source is used by user 102, so service provider server 150 may determine exchange rates and fees available for particular user 102 by determining exchange rates and fees for each combination of candidate transaction location and funding source.

At step 212, service provider server 150 generates suggestion information based on a comparison of the exchange rates and fees. In various embodiments, service provider server 150 (e.g., using suggestion module 164) generates suggestion information by selecting at least one transaction location, funding source, and/or transaction location-funding source combination to suggest to user based on comparing the exchange rates and fees. In certain embodiments, service provider server 150 generates the suggestion information further based on whether each of the one or more candidate transaction locations is in a safe area (e.g., crime in area), taking into account the time of day. In further embodiments, the suggestion information may include other information that may be helpful to user 102. For example, the suggestion information may provide a comparison of using cash to using other funding sources, such as credit cards or debit cards. In another example, the suggestion information may include a map to show suggested transaction locations to be presented on user device 120.

At step 214, service provider server 150 transmits the suggestion information to user device 120. In an embodiment, user 102 may view suggestion information on user device 120 and advantageously make an informed decision on where to go for the transaction and/or which funding source to use.

Figure 3:
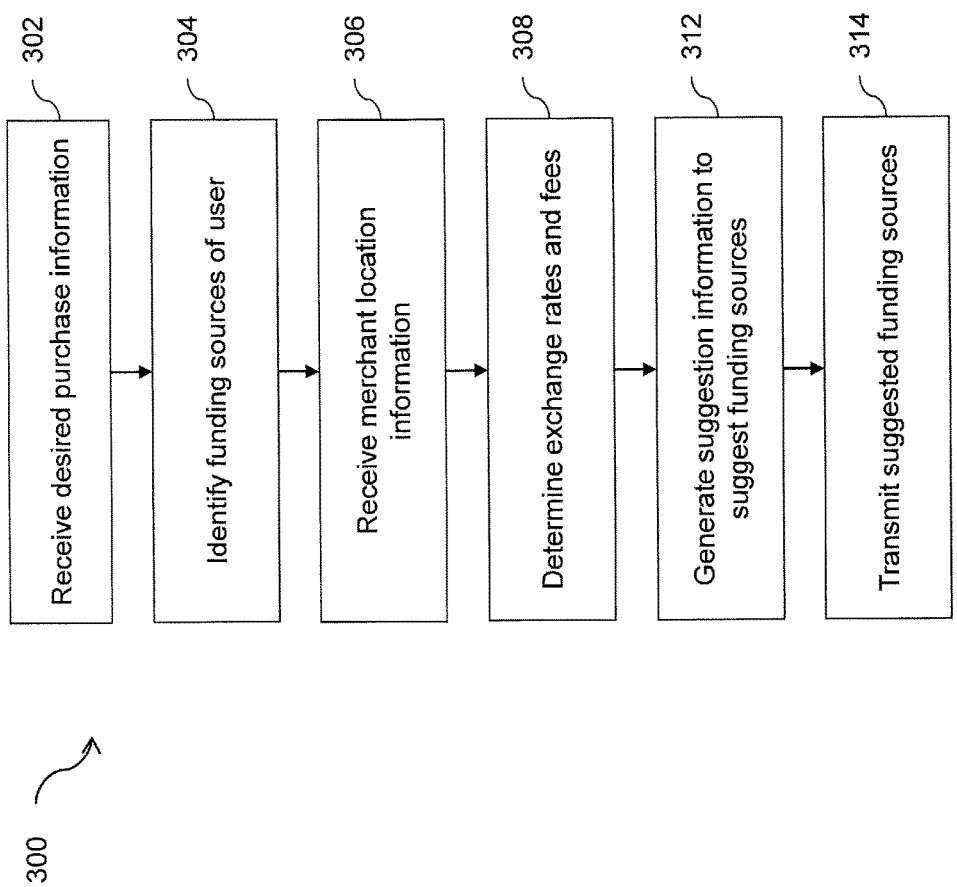
FIG. 3 is a flowchart showing a method for suggesting funding sources for a purchase according to an embodiment of the present disclosure.

Referring now to FIG. 3, a flowchart 300 showing a method for suggesting funding sources for a purchase is illustrated according to an embodiment of the present disclosure.

At step 302, service provider server 150 receives desired purchase information from user device 120. In an embodiment, user 102 traveling abroad (or shopping online on a foreign website) may be interested in making a purchase from a merchant that accepts a foreign currency. User 102 may enter information relating to a desired purchase on user device 120, which transmits the desired purchase information to service provider server 150. The desired purchase information may include, for example, a price of an item for purchase, a merchant location at which user 102 is contemplating the purchase, the identity of the item, and/or other desired purchase information.

At step 304, service provider server 150 identifies funding sources available to user 102, as described at step 204 of FIG. 2.

At step 306, service provider server 150 may receive merchant location information. In an embodiment, user device 120 accesses location module 126 to determine user device 120 is at a merchant location, and transmits merchant location information for the merchant location to service provider server 150. In another embodiment, user 102 enters a merchant location on user device 120, for example, by entering in the name of a merchant and address/zip code, searching for a merchant location, and/or selecting a merchant location. In a further embodiment, user device 120 checks in to a merchant location by communicating with a merchant device (e.g., a beacon), and the merchant location information is based on the check-in. In certain embodiments, service provider server 150 may not receive merchant location information, for example, because the desired purchase is for any merchant location or an unspecified merchant location (e.g., any or an unspecified convenient store, supermarket, or drugstore), or user 102 does not provide merchant location information.

At step 308, service provider server 150 may determine exchange rates and fees for the desired purchase. In an embodiment, service provider server 150 (e.g., using determination module 162) determines exchange rates and fees available to user 102 based on the funding sources available to user 102. In certain embodiments in which service provider server 150 has received merchant location information, service provider server 150 determines exchange rates and fees available to user 102 that is specific for the merchant location, which may include a DCC rate. Service provider server 150 may also take into account what funding sources of user 102 that the merchant location accepts for payments.

At step 310, service provider server 150 generates suggestion information that includes suggested funding sources for the desired purchase based on a comparison of the exchange rates and fees. In an embodiment, service provider server 150 (e.g., using suggestion module 164) generates suggestion information that provides a comparison of using cash, using credit/debit card and choosing the exchange rate of the credit card issuer/bank, using credit/debit card and choosing the DCC rate, and other payment options. In certain embodiments in which service provider server 150 has received merchant location information, service provider server 150 may generate suggestion information that includes suggested combinations of merchant location and funding source.

At step 312, service provider server 150 transmits the suggestion information to user device 120.

Figure 4:
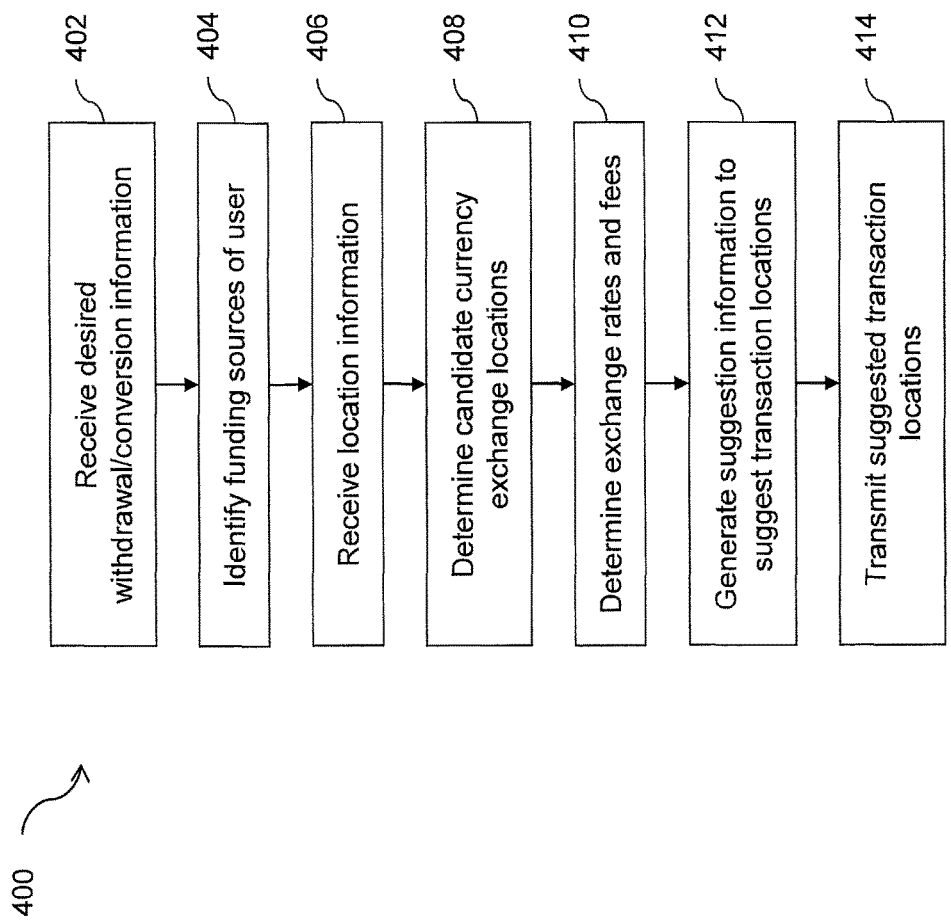
FIG. 4 is a flowchart showing a method for suggesting transaction locations for a withdrawal/conversion according to an embodiment of the present disclosure.

Referring now to FIG. 4, a flowchart 400 showing a method for suggesting transaction locations for a withdrawal/conversion is illustrated according to an embodiment of the present disclosure.

At step 402, service provider server 150 receives desired withdrawal/conversion information from user device 120. In an embodiment, user 102 traveling abroad may be interested in withdrawing foreign currency from a funding source of user 102 or converting cash to foreign currency at a currency exchange location (e.g., ATMs, currency exchange booths, or bank locations, etc.). User 102 may enter information relating to a desired withdrawal or conversion on user device 120, which transmits the desired withdrawal/conversion information to service provider server 150. The desired withdrawal/conversion information may include, for example, an amount of money to be withdrawn from a funding source, an amount of cash to be converted to a different currency, a current location of user 102, preferred type of currency exchange location (e.g., ATMs, branches of a particular bank, etc.), and/or other desired withdrawal/conversion information.

At step 404, service provider server 150 identifies funding sources available to user 102, as described at step 204 of FIG. 2. In certain embodiments, service provider server 150 may not identify funding sources available to user 102, for example, because user 102 does not provide account information designating funding sources of user 102 to service provider server 150.

At step 406, service provider server 150 receives location information from user device 120, as described at step 206 of FIG. 2.

At step 408, service provider server 150 determines one or more candidate currency exchange locations based on the location information, as described at step 206 in FIG. 2.

At step 410, service provider server 150 determines exchange rates and transaction fees for the desired withdrawal or conversion. In an embodiment, service provider server 150 (e.g., using determination module 162) determines exchange rates and fees available to user 102 at each of the one or more candidate currency exchange locations. In certain embodiments in which service provider server 150 has identified funding sources of user 102, service provider server 150 determines exchange rates and fees available to user 102 at each currency exchange location that is specific to the funding sources of user 102. Service provider server 150 may also take into account what funding sources of user 102 that the currency exchange location accepts for withdrawal or conversion.

At step 412, service provider server 150 generates suggestion information that includes suggested currency exchange locations based on a comparison of the exchange rates and fees. In an embodiment, service provider server 150 (e.g., using suggestion module 164) generates suggestion information that includes suggested currency exchange locations by comparing the exchange rates and fees at each of the candidate currency exchange locations. In certain embodiments in which service provider server 150 has received account information associated with user 102, service provider server 150 may generate suggestion information that includes suggested combinations of currency exchange location and funding source.

At step 414, service provider server 150 may transmit the suggestion information to user device 120.

Figure 5:
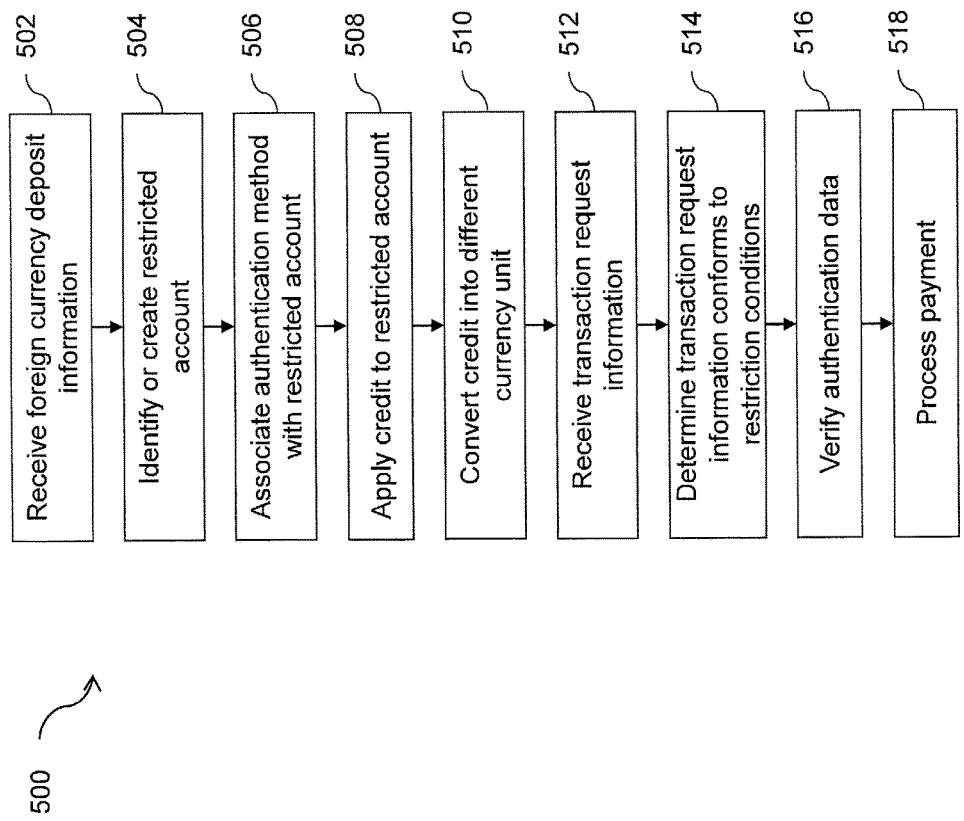
FIG. 5 is a flowchart showing a method for exchange of foreign currency for credit according to an embodiment of the present disclosure.

FIG. 5 is a flowchart 500 showing a method for exchange of foreign currency for credit according to one embodiment.

At step 502, service provider server 150 receives foreign currency deposit information. In an embodiment, user 102 deposits foreign currency cash at a merchant or a financial institution that accepts payment through service provider server 150. Merchant server 140 associated with the merchant, financial service provider server 180 associated with the financial institution, and/or user device 120 may transmit foreign currency deposit information for the deposit to service provider server 150. Foreign currency deposit information may include an amount of the foreign currency cash that was deposited, user information, and/or an identifier for merchant or financial institution (e.g., merchant identifier 148). The user information may include, for example, personal information (e.g., one or more of names, usernames, passwords, photograph images, biometric IDs, addresses, phone numbers, social security number, etc.), user identifier 124, a barcode (e.g., a QR code) associated with a user account of user 102, and/or other user information that may identify user 102, user device 120, a user account associated with user 102, and/or a user account associated with user device 120.

At step 504, service provider server 150 identifies an existing user account with restriction conditions 158. If an existing user account of user 102 does not exist, service provider server 150 may create a new user account for user 102 with restriction conditions 158. In an embodiment, service provider server 150 (e.g., using service module 166) uses the user information to determine whether user 102 has an existing user account.

At step 506, service provider server 150 associates an authentication with the user account. In an embodiment, service provider server 150 (e.g., using service module 166) may generate a barcode (e.g., a QR code), associate the barcode with the user account, and transmit the barcode or user identifier 124 to user device 120. The authentication includes user 102 providing a barcode. In another embodiment, service provider server 150 (e.g., using service module 166) may generate a barcode, associate the barcode with the user account, and transmit the barcode to user device 120. In an embodiment, service provider server 150 (e.g., using service module 166) may associate user identifier 124 with the user account. The authentication includes user 102 checking in at a location by the user device transmitting user identifier 124 to a device at the location (e.g., a beacon). In a further embodiment, service provider server 150 may receive credentials (e.g., password, user ID, username phone number, email address, etc.), and associate the credentials with the user account. The authentication includes user 102 entering the credentials on user device 120 or a merchant device.

At step 508, service provider server 150 applies credit to the user account with restriction conditions 158. In an embodiment, service provider server 150 (e.g. using service module 166) applies foreign currency credit to the user account.

At step 510, service provider server 150 converts the credit into a different currency unit. In an embodiment, service provider server 150 (e.g. using service module 166) converts the foreign currency credit to domestic currency credit. In certain embodiments, service provider server 150 converts the credit when it is applying the credit to the user account. In other embodiments, service provider server 150 converts the credit when it receives user authorization from user device 120. In further embodiments, service provider server 150 may transmit an alert to user device 120 when the conversion rate becomes more favorable to user 102 and/or suggest when to convert the credit.

At step 512, service provider server 150 receives transaction request information. In an embodiment, user 102 initiates a transaction using or designating the user account with a merchant or a financial institution. User device 120, merchant server 140 associated with the merchant, or financial service provider server 180 associated with the financial institution may transmit transaction request information. Service provider server 150 (e.g., using transaction processing module 168) receives the transaction request information, which may include authentication data.

At step 514, service provider server 150 determines whether the transaction request information conforms to restricted conditions 158. In an embodiment, service provider server 150 (e.g., using transaction processing module 168) accesses account information 156 that includes restriction conditions 158 associated with the user account to determine whether the transaction request information conforms to restricted conditions 158. Restriction conditions 158 provide that purchases of items are allowed but cash withdrawals are to be denied.

At step 516, service provider server 150 verifies the authentication data. In an embodiment, service provider server 150 (e.g., using transaction processing module 168) verifies authentication data by determining whether the authentication data matches the authentication associated with the user account. Depending on the authentication associated with the user account, the authentication data may be based on a scanned barcode, a check-in comprising a communication between a user device and a merchant device, or an entry of credentials.

At step 518, service provider server 150 processes the transaction or denies the transaction. In an embodiment, service provider server 150 (e.g., using transaction processing module 168) processes purchases using the user account, but denies cash withdrawal requests from the user account, in accordance with restriction conditions 158.

Figure 6:
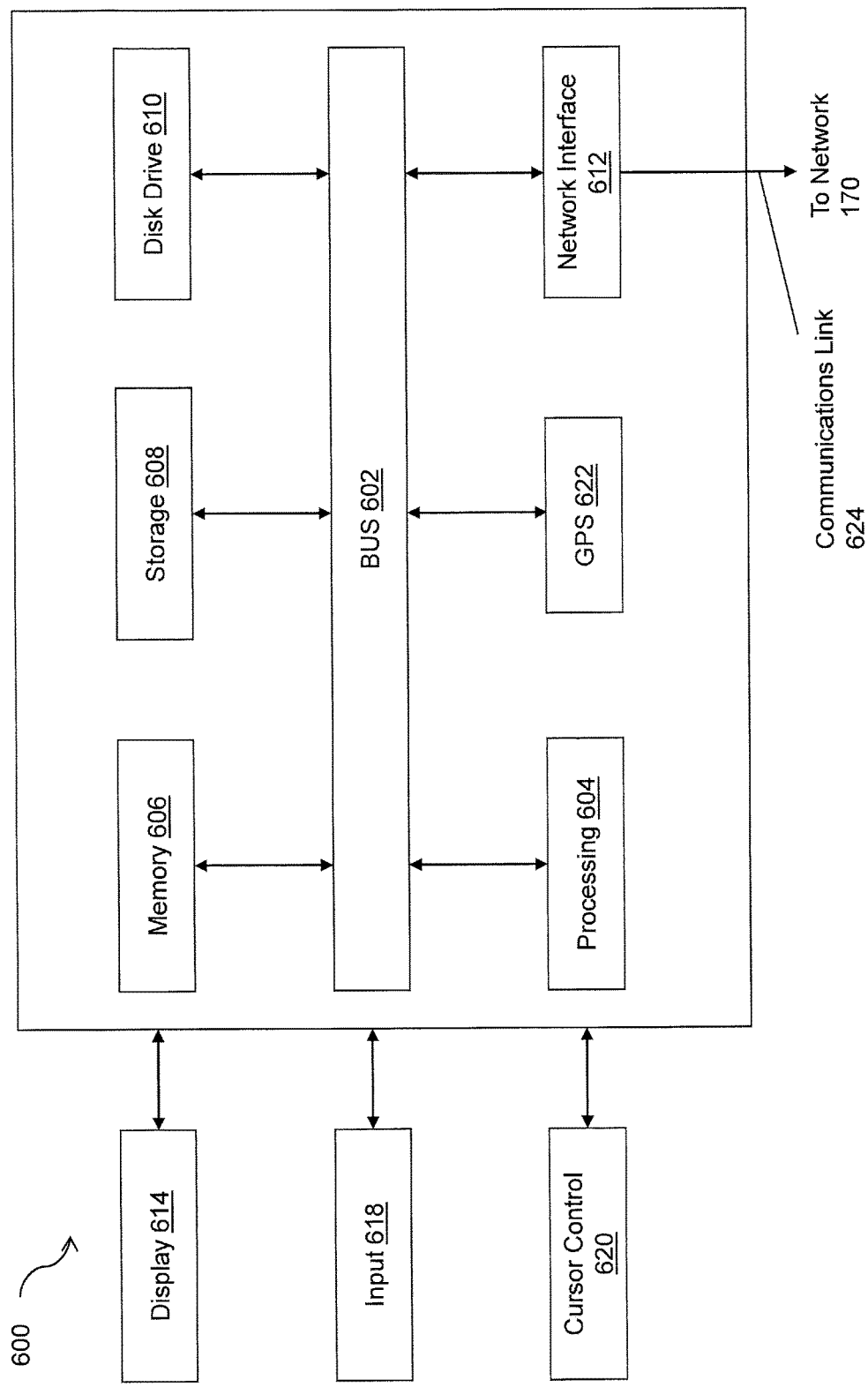
FIG. 6 is a block diagram of a computer system suitable for implementing one or more components in FIG. 1 according to an embodiment of the present disclosure.

Referring now to FIG. 6, an embodiment of a computer system 600 suitable for implementing, for example, the user device, service provider server, merchant server, and/or financial service provider server is illustrated according to an embodiment of the present disclosure. It should be appreciated that other devices utilized by users, service providers, and/or merchants in the system discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., light-emitting diode (LED) display component, organic light-emitting diode (OLED) component, liquid-crystal (LCD) display component, plasma display panel (PDP), cathode ray tube (CRT) display component, or other display component), an input component 618 (e.g., keyboard, keypad, virtual keyboard, touchscreen, etc.), a cursor control component 620 (e.g., mouse, pointer, trackball, etc.), and/or a location determination component 622 (e.g., a Global Positioning System (GPS) device as illustrated, a cell tower triangulation device, and/or a variety of other location determination devices known in the art). In one implementation, the disk drive component 610 may comprise a database having one or more disk drive components.

In accordance with embodiments of the present disclosure, the computer system 600 performs specific operations by the processor 604 executing one or more sequences of instructions contained in the memory component 606, such as described herein with respect to the user device, service provider server, merchant server, and/or financial service provider server. Such instructions may be read into the system memory component 606 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 600. In various other embodiments of the present disclosure, a plurality of the computer systems 600 coupled by a communication link 624 to the network 170 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

In view of the present disclosure, it will be appreciated that various devices, systems, and methods have been described according to one or more embodiments for providing funding source and/or currency exchange location comparison, and exchange of foreign currency for credit.

Although various components and steps have been described herein as being associated with user device 120, merchant server 140, service provider server 150, and/or financial service provider server 180 of FIG. 1, it is contemplated that the various aspects of such devices and servers illustrated in FIG. 1 may be distributed among a plurality of servers, devices, and/or other entities.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:

identifying, by one or more hardware processors, one or more candidate funding sources available to a user, wherein each of the one or more candidate funding sources is associated with an authentication code and at least one restriction condition;

obtaining, by the one or more hardware processors over a network, location information from a geo-location component of a user device of the user, wherein the location information indicates a geographical location of the user;

determining, by the one or more hardware processors, a plurality of candidate transaction locations located within a predetermined distance of the geographical location of the user;

determining, by the one or more hardware processors, exchange rates and fees available to the user at each of the plurality of candidate transaction locations based on the one or more candidate funding sources available to the user;

comparing, by the one or more hardware processors, the exchange rates and fees available to the user;

generating, by the one or more hardware processors, a suggestion of using a first funding source selected from the one or more candidate funding sources at a first transaction location selected from the plurality of candidate transaction locations based on the comparing of the exchange rates and fees;

causing, by the one or more hardware processors, the user device to display a map that indicates a position of the first transaction location relative to the geographical location of the user;

determining, by the one or more hardware processors based on an electronic signal wirelessly transmitted to a beacon associated with the first transaction location from the user device, that the user device is located at the first transaction location;

receiving, by the one or more hardware processors from a point-of-sale (POS) device of the first transaction location, a request for a purchase using the first funding source, wherein the request comprises a machine-readable code scanned by the POS device;

accessing, by the one or more hardware processors, the authentication code and the restriction condition(s) associated with the first funding source;

verifying, by the one or more hardware processors, that the machine-readable code scanned by the POS device matches the authentication code associated with the first funding source;

determining, by the one or more hardware processors, that the purchase satisfies the restriction condition(s) associated with the first funding source; and in response to verifying that the machine-readable code scanned by the POS device matches the authentication code associated with the first funding source and determining that the purchase satisfies the restriction condition(s) associated with the first funding source, automatically processing, by the one or more hardware processors, the request for the purchase.

2. The method of claim 1, wherein the plurality of candidate transaction locations comprise a merchant, wherein the suggestion is for a purchase from the merchant, and wherein the suggestion is generated based on a comparison of purchasing with cash and purchasing with the one or more candidate funding sources.

3. The method of claim 1, wherein generating the suggestion is further based on safety levels of the plurality of candidate transaction locations and a current time.

4. The method of claim 1, further comprising:

receiving, by the one or more hardware processors over the network, foreign currency deposit information for a deposit amount from the user device, wherein the deposit amount is based on a first currency unit;

applying, by the one or more hardware processors, a credit to a user account of the user according to the deposit amount;

converting, by the one or more hardware processors, the credit from the first currency unit to a second currency unit;

associating, by the one or more hardware processors, second restriction conditions with the user account, wherein the second restriction conditions allow purchases with the user account and deny cash withdrawals from the user account;

receiving, by the one or more hardware processors from the user device over the network, transaction request information for a transaction with the user account;

determining, by the one or more hardware processors, that the transaction request information conforms to the second restriction conditions associated with the user account; and processing, by the one or more hardware processors, the transaction using the user account based on a determination that the transaction request information conforms to the second restriction conditions.

5. The method of claim 4, further comprising:

associating, by the one or more hardware processors, first authentication data with the user account;

receiving, by the one or more hardware processors over the network, second authentication data from the user device, wherein the second authentication data is based on one of a scanned barcode, a check-in comprising a communication between the user device and a merchant device, or an entry of credentials by the user; and verifying, by the one or more hardware processors, an identity of the user based on a difference between the first authentication data and the second authentication data, wherein the processing the transaction using the user account is further based on a positive verification of the identity of the user.

6. The method of claim 4, further comprising:

transmitting, by the one or more hardware processors over the network, an alert to the user device, wherein the alert comprises an indication of a conversion rate for converting the credit from the first currency unit to the second currency unit; and converting, by the one or more hardware processors, the credit from the first currency unit to the second currency unit only after receiving a user authorization from the user device.

7. The method of claim 4, further comprising:

receiving, by the one or more hardware processors over the network, transaction request information for a cash withdrawal;

determining, by the one or more hardware processors, that the transaction request information does not conform to the restriction conditions associated with the user account; and denying, by the one or more hardware processors, the cash withdrawal from the user account.

8. The method of claim 1, further comprising providing on the user device a comparison of exchange fees and rates based on using cash and using the one or more candidate funding sources at the first transaction location.

9. The method of claim 1, further comprising:

transmitting, by the one or more hardware processors over the network, a request for information regarding a transaction at the first transaction location to a second user device of another a second user; and receiving, by the one or more hardware processors over the network, requested information from the second user device, wherein the requested information comprises at least one of exchange rate and fee information, a confirmation of the exchange rate and fee, a safety rating of the transaction location, or a convenience rating of the first transaction location; and storing, by the one or more hardware processors, the exchange rate and fee information and the transaction location information, wherein generating the suggestion is further based on the stored exchange rate and fee information.

10. The method of claim 9, further comprising updating the exchange rate and fee information and the transaction location information based on new requested information received over the network.

11. A system, comprising:

a non-transitory memory;

one or more hardware processors communicatively coupled to the non-transitory memory and configured to read instructions from the non-transitory memory to cause the system to perform operations comprising:

identifying one or more candidate funding sources available to a user, wherein each of the one or more candidate funding sources is associated with an authentication code and at least one restriction condition;

obtaining, over a network, location information from a geo-location component of a user device of the user, wherein the location information indicates a geographical location of the user;

determining a plurality of candidate transaction locations located within a predetermined distance of the geographical location of the user;

determining exchange rates and fees available to the user at each of the plurality of candidate transaction locations based on the one or more candidate funding sources available to the user;

comparing the exchange rates and fees available to the user;

generating a suggestion of using a first funding source selected from the one or more candidate funding sources at a first transaction location selected from the plurality of candidate transaction locations based on the comparing of the exchange rates and fees;

causing the user device to display a map that indicates a position of the first transaction location relative to the geographical location of the user;

determining, based on an electronic signal wirelessly transmitted to a beacon associated with the first transaction location from the user device, that the user device is located at the first transaction location;

receiving, from a point-of-sale (POS) device of the first transaction location, a request for a purchase using the first funding source, wherein the request comprises a machine-readable code scanned by the POS device;

accessing the authentication code and the restriction condition(s) associated with the first funding source;

verifying that the machine-readable code scanned by the POS device matches the authentication code associated with the first funding source;

determining that the purchase satisfies the restriction condition(s) associated with the first funding source; and in response to verifying that the machine-readable code scanned by the POS device matches the authentication code associated with the first funding source and determining that the purchase satisfies the restriction condition(s) associated with the first funding source, automatically processing the request for the purchase.

12. The system of claim 11, wherein the plurality of candidate transaction locations comprise a merchant, wherein the suggestion is for a purchase from the merchant, and wherein the suggestion is generated based on a comparison of purchasing with cash and purchasing with the one or more candidate funding sources.

13. The system of claim 11, wherein generating the suggestion is further based on safety levels of the plurality of candidate transaction locations and a current time.

14. The system of claim 11, wherein the operations further comprise providing on the user device a comparison of exchange rates and fees based on using cash and using the first funding source.

15. The system of claim 11, wherein the operations further comprise:

transmitting, via the network, a request for information regarding a transaction at the first transaction location to a second user device of a second user; and receiving, over the network, requested information from the second user device, wherein the requested information comprises at least one of exchange rate and fee information, a confirmation of the exchange rate and fee, a safety rating of the transaction location, or a convenience rating of the first transaction location; and storing the exchange rate and fee information and the transaction location information, wherein generating the suggestion is further based on the stored exchange rate and fee information.

16. The system of claim 15, wherein the operations further comprise updating the exchange rate and fee information and the transaction location information based on new requested information received over the network.

17. The system of claim 11, wherein the operations further comprise:

receiving, via the network, foreign currency deposit information for a deposit amount from the user device, wherein the deposit amount is based on a first currency unit;

applying a credit to a user account of the user according to the deposit amount;

converting the credit from the first currency unit to a second currency unit;

associating second restriction conditions with the user account, wherein the second restriction conditions allow purchases with the user account and deny cash withdrawals from the user account;

receiving, via the network, transaction request information for a transaction with the user account;

determining that the transaction request information conforms to the second restriction conditions associated with the user account; and processing the transaction using the user account based on a determination that the transaction request information conforms to the second restriction conditions.

18. A non-transitory machine readable medium having stored thereon machine-readable instructions executable to cause a machine to perform operations comprising:

identifying one or more candidate funding sources available to a user, wherein each of the one or more candidate funding sources is associated with an authentication code and at least one restriction condition;

obtaining, over a network, location information from a geo-location component of a user device of the user, wherein the location information indicates a geographical location of the user;

determining a plurality of candidate transaction locations location within a predetermined distance of the geographical location of the user;

determining exchange rates and fees available to the user at each of the plurality of candidate transaction locations based on the one or more candidate funding sources available to the user;

comparing the exchange rates and fees available to the user;

generating a suggestion of using a first funding source selected from the one or more candidate funding sources at a first transaction location selected from the plurality of candidate transaction locations based on the comparing of the exchange rates and fees;

causing the user device to display a map that indicates a position of the first transaction location relative to the geographical location of the user;

determining, based on an electronic signal wirelessly transmitted to a beacon associated with the first transaction location from the user device, that the user device is located at the first transaction location;

receiving, from a point-of-sale (POS) device of the first transaction location, a request for a purchase using the first funding source, wherein the request comprises a machine-readable code scanned by the POS device;

accessing the authentication code and the restriction condition(s) associated with the first funding source;

verifying that the machine-readable code scanned by the POS device matches the authentication code associated with the first funding source;

determining that the purchase satisfies the restriction condition(s) associated with the first funding source; and in response to verifying that the machine-readable code scanned by the POS device matches the authentication code associated with the first funding source and determining that the purchase satisfies the restriction condition(s) associated with the first funding source, automatically processing the request for the purchase.

19. The non-transitory machine readable medium of claim 18, wherein generating the suggestion is further based on safety levels of the plurality of candidate transaction locations and a current time.

20. The non-transitory machine readable medium of claim 18, wherein the operations further comprise providing on the user device a comparison of exchange rates and fees based on using cash and using the first funding source.

* * * * *

UNITED STATES PATENT AND TRADEMARK OFFICE
CERTIFICATE OF CORRECTION

PATENT NO. : 10,181,123 B2
APPLICATION NO. : 14/541593
DATED : January 15, 2019
INVENTOR(S) : German Scipioni Page 1 of 1

It is certified that error appears in the above-identified patent and that said Letters Patent is hereby corrected as shown below:

In the Claims

In Column 21, Line 27, remove "another".

Signed and Sealed this
Fifth Day of May, 2020

Andrei Iancu
*Director of the United States Patent and Trademark Office*